Jan. 31, 1967    G. THESING    3,300,944
METHOD AND APPARATUS FOR MAKING PARALLELEPIPED PACKAGES
Filed July 10, 1964    4 Sheets-Sheet 2

INVENTOR
GEORG THESING
BY McGlew and Toren
ATTORNEYS

Jan. 31, 1967   G. THESING   3,300,944
METHOD AND APPARATUS FOR MAKING PARALLELEPIPED PACKAGES
Filed July 10, 1964   4 Sheets-Sheet 4

INVENTOR
GEORG THESING
BY
McGlew and Toren
ATTORNEYS

United States Patent Office 3,300,944
Patented Jan. 31, 1967

3,300,944
METHOD AND APPARATUS FOR MAKING
PARALLELEPIPED PACKAGES
Georg Thesing, Dortmund-Schonau, Germany, assignor to Holstein & Kappert, Maschinenfabrik Phonix GmbH, Dortmund, Germany
Filed July 10, 1964, Ser. No. 381,846
Claims priority, application Germany, July 18, 1963, H 49,746
20 Claims. (Cl. 53—28)

This invention relates to the production of parallelpiped packs or cells, filled with fluent material, from a continuous flexible tube filled to a predetermined level with the fluent material, without any preliminary compression of the tube walls at the ends of the individual cells and the formation of seals, followed by severing of the individual packs or cells from each other. More particularly, the present invention is directed to an improved method and apparatus for such production of parallelpiped packs or cells, and which are free of the disadvantages of prior art arrangements.

Methods of producing packs or cells filled with fluent material using a continuous flexible tube without any preliminary compression of the tube wall in the region of the top and bottom of the packs to be formed, have generally, in comparison with those methods which employ previously impressed flexible tubes, the extremely important advantage that no control and adjusting devices of any kind are required to bring the preliminary impression or crease lines of the flexible tube into synchronism or registry with the tools effecting the folding in, and to keep them in such synchronism or registry throughout the production process.

Nevertheless, previously known methods for producing filled packs or cells in this manner still have a number of drawbacks which have hitherto prevented the actual carrying into practice of the same. Thus, in a known cyclically operated process, a filled flexible tube is intended to be gripped from opposite sides by two cell shaping halves and brought into parallelepiped form in co-operation with stationarily arranged lateral shaping elements. The shaping members convey the formed pack and the tube following thereon a little further and the transverse seams are produced by means of welding devices suitably provided on the shaping members. The shaping members are intended to return to the starting position for the next working cycle after they have been disengaged from the formed pack. Apart from the fact that very high outputs cannot be achieved with such cyclic processes, this known process has the particular disadvantage that, when the cell shaping halves are pressed against the filled flexible tube, in the region of the top and bottom seals, relative movements between the flexible tube and the shaping members are unavoidable and these result in undesirable stresses on the material of the tube and make the formation of neat parallelpipeds doubtful. Moreover, the advance of the flexible tube is effected by the forward movement of the shaping tools after they have completed contact with the tube, and additional stresses on the material of the tube occur, in particular in the region of the edges of the shaping members.

In a known continuously operated method, a filled flexible tube runs in between two endless chains on which welding jaws producing the transverse seams revolve, and the lateral shaping of the packs is effected by stationarily arranged shaping surfaces. Apart from the fact that, in this method, the welding jaws acting on the tube do not ensure the formation of exact parallelepipeds, there still remains the drawback of a relative movement between the tube walls and stationarily arranged shaping elements, and particularly, in the region of the welding jaws forming the transverse seams.

Furthermore, a number of methods are known in which cushion-shaped or cone-shaped packs are formed from a filled flexible tube between continuously revolving bands or rotary bodies. All these known methods, however, have the common drawback that they involve relatively large stresses exerted on the material of the pack during the conversion, apart from the fact that exact parallelepipedal packs cannot be produced by the known methods.

An object of the present invention is to provide a novel method of the mentioned type in which the foregoing disadvantages of prior art methods and apparatuses of this type are avoided.

In accordance with the present invention, the filled flexible tube is gripped laterally over its entire periphery under frictional contact, and with the formation of a rectangular cross section, and is thereby moved along continuously with the limit of adhesion, in the zone of advance, not being exceeded during the course of the shaping of the packs or cells into an exact parallelepiped form or during the course of formation of the end seals. While the method of the invention achieves very high output capacities, it nevertheless insures extremely careful handling of the material of the pack or cell together with absolutely neat folding in of the pack while attaining an exact parallelepiped form.

Another object of the invention is to provide a method of the mentioned type in which the shaped individual packs or cells are maintained in communication with the fluent material in the endless tube until the conclusion of the shaping, with such communication being interrupted only at the time of producing the transverse or end seams.

A further object of the invention is to provide a method of the mentioned type in which the individual packs or cells are separated from each other only after complete shaping and while they are still maintained in the completely encased state.

Still another object of the invention is to provide a novel apparatus for carrying out the aforementioned method of producing parallelepiped packs or cells filled with fluent material from a continuous flexible tube without any preliminary compression of the tube wall at the ends of the packs to be formed.

In accordance with the invention, the apparatus comprises two endless chains comprising shaping members, determining the size of the pack, and folding members connecting the shaping members, which folding members form the end walls closing the shaping members in the course of the advancing movement. The shaping members of each chain can be in the form of rectangular open ended channel-shaped cell halves which are applied against the flexible tube on the commencement of the encasing operation, and to each of the two ends of which there is articulated a folding flap. Each flap, on the commencement of the encasing operation carried out on the flexible tube, is located in the plane of the base portion of the associated cell half, and is adapted to be swung inward through 90° towards the tube, in the course of the further advance, about an axis located at the inner end edge of the shaping member, forming a half end wall of the shaping cell and suitably creasing the filled flexible tube to form the desired parallelepiped back.

Advantageously, the folding flaps project on both sides beyond the rectangular channel-shaped cell halves in such manner that, on the swinging in of the folding flaps and the formation of the parallelepiped pack, the known, triangular terminal lobes empty of the filling material are formed in this region. The folding flaps of adjacent cell halves are articulated to one another by way of connecting links, the length of which is determined by the height, or depth, of the desired transverse seam or spacing between adjacent packs. Moreover, the folding flaps are provided with welding devices for producing the transverse seams.

Preferably, the folding flaps have a width smaller than one half of the end wall of the pack, so that, in the swung-in state of the folding flaps, a small gap is left between the opposing edges of each pair of cooperable folding flaps in the region of a transverse seam, in such manner that the filling material in each pack formed in and encased by the adjacent shaping cells is still in communication with the material thereabove in the tube.

An advantageous and simple arrangement is obtained when fixed counter welding jaws are arranged in the folding flaps forming part of one endless chain, and opposite the same, in the folding flaps forming part of the other endless chain, there are arranged welding jaws which, in the swung-in state of the folding flaps, are movable towards the counter welding jaws in such manner that the gap, which is at first left open between the opposite folding flaps, can be closed when the transverse seam is produced.

Separation of the filled packs or cells from each other is effected by a serrated parting knife arranged in the central zone of the welding jaws. This parting knife is preferably guided in the movable welding jaw, and preferably has a longitudinally arcuate cutting edge so that the parting operation will not take place abruptly over over the full width of the pack simultaneously, but will be effected as gently as possible while at the time reducing the force required for actuating the parting knife.

For precision shaping of the packs or cells, the mating shaping members of the two endless chains, after abutment to form the common shaping cell, are interengaged by means effecting form locking or complete contact in the plane of separation of the shaping halves. Furthermore, the shaping members of the two endless chains can be pressed against each other, at right angles to the direction of advance, after the shaping members have been guided into engagement by stationary guide members.

A control cam or the like may be used to effect swinging in of the folding flaps to an angle of about 45°. Advantageously, further swinging in of the folding flaps is effected by means of fixedly positioned driving rollers whose speed is reduced by degrees in the direction of tube advance. Braked rollers are fixedly positioned downstream of the welding and parting zones with respect to the direction of advance, and operate in such a manner that, during the welding and parting operations, a force maintaining the parallelepiped form and acting in the direction of advance is exerted on the shaping members.

To facilitate feeding of the filled flexible tube to the shaping tools, suitably shaped guide members or elements preferably are positioned stationarily immediately in advance of the zone where the two endless chains come together, and preferably the inner surfaces of the guide elements, which bear against the flexible tube, are made convex in a longitudinal direction.

For an understanding of the principles of the invention, reference is made to the following description of a typical embodiment thereof as illustrated in the accompanying drawings.

Figure 1:
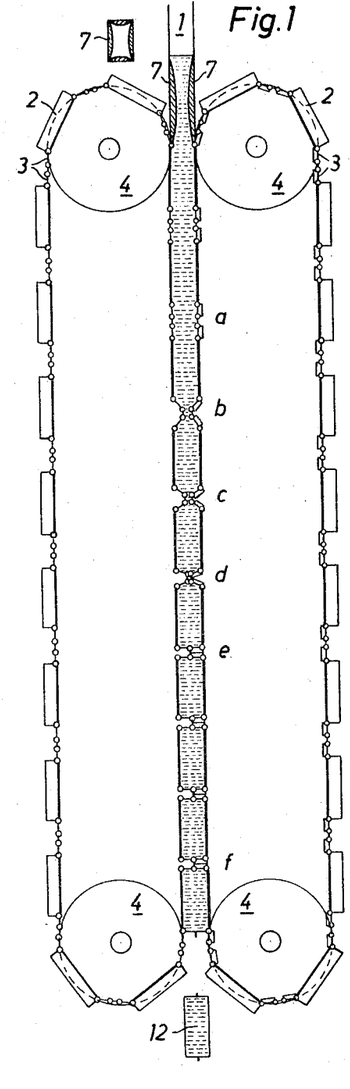
FIG. 1 is a diagrammatic general side view of an apparatus according to the invention.
Figure 2:
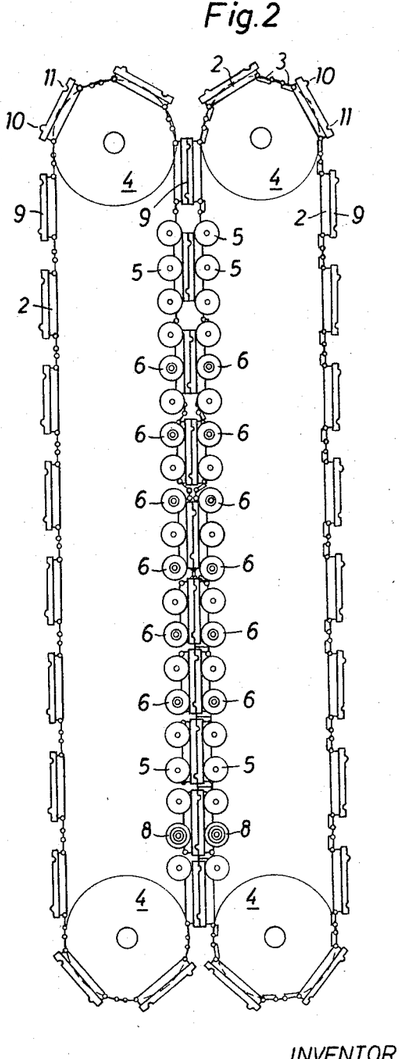
FIG. 2 is a general view similar to FIG. 1 which makes clear the control of the shaping process and the formation of the shaping cells.
Figure 3:
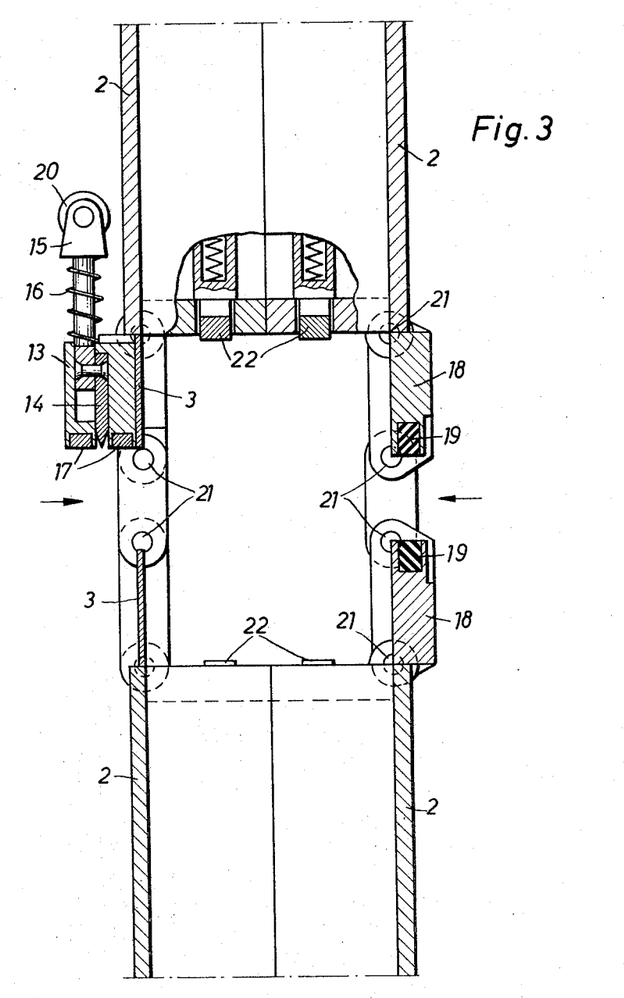
FIG. 3 is a longitudinal section through two adjacent shaping cells, formed by the running together of two shaping cell halves, prior to the swinging in of the folding flaps forming the end walls of the shaping cells.

Referring to FIGS. 1 and 2, a tube 1, of suitable flexible material, and which is filled to a predetermined level with fluent material, is completely encased laterally by rectangular channel-shaped cell halves 2 which are arranged on two endless chains trained around return wheels 4. The halves 2 of the shaping cells are articulated to one another by folding flaps 3. Guide plates 7, assembled to form a tube, and which are intended to assist smooth enclosure of flexible tube 1 by shaping cells 2, may be provided in the region of the zone where the two endless chains are brought together. During the further advance movement of flexible tube 1 in the region of the stations $a$–$e$ of FIG. 1 closed parallelepiped shape cells are formed by appropriate swinging in of the folding flaps 3. Preferably, flaps 3 are initially folded inwardly up to an angle of 45° by means of a control cam (not shown), while the further inward folding action is then preferably effected by means of stationarily arranged driving rollers 6, the speed of which is reduced by degrees in the direction of advance (see FIG. 2). In the region $e$–$f$ of FIG. 1, the welding of the transverse seams and the separation of the packs from one another is then effected, maintenance of the closed shaping position of the shaping cells being insured in this region by means of braked rollers 8 (FIG. 2).

In the region extending as far as the zone $b$ of FIG. 1, and in which there is still no separation of tube 1 by cell halves 2 into partially or completely shaped cells, the advance movement of tube 1 is effected exclusively by means of the frictional contact produced between the channel parts of the shaping cell halves and the wall of the flexible tube, by the internal pressure of the fluent filling material or contents. Thus, on the commencement of the formation of the top and bottom seals in the region of the zone $b$, no pulling forces of any kind are exerted on the flexible tube. In this way, not only are undesirable stresses on the material of the flexible tube prevented but, above all, any relative movements between the material of the flexible tube and the shaping tools are also prevented from occurring. In particular, a lifting away of the material of the tube in the region of the connections between shaping cells 2 and folding flaps is prevented. On the contrary, the material of the tube conforms exactly and without any resistance to the shaping members in every position thereof. Consequently, it has been found that, by virtue of the invention method, extremely neat creasing of the packs or cells is obtained.

In order to ensure exact correlation of the two shaping cell halves 2 disposed one opposite the other, they are provided, as will be seen from FIG. 2, with projections 10 and depressions 11 which engage one another as the cell halves run together. Guide rollers 5, bearing against guide surfaces 9 on shaping cell halves 2, press the mating cell halves 2 together tightly throughout the path of advance, so that suitable fixing in position of the shaping cells is ensured during the entire operation.

FIGS. 3–7 show further details of the apparatus and more particularly of the shaping cells. As will be seen from these figures, the rectangular channel-shaped halves 2 of the shaping cells are connected to folding flaps 3 at both ends by way of joints or hinges 21, connecting links being articulated between the folding flaps of two adjacent shaping cell halves. The length of these links is determined by the height or depth of the desired transverse seam or spacing between adjacent packs.

Figures 6, 7:
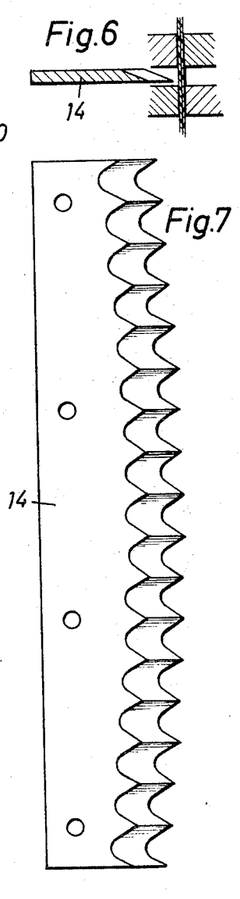
FIG. 6 is a sectional view illustrating the operation of the parting knife.
FIG. 7 is a side elevation view of the parting knife.

The folding flaps 3 arranged on one of the endless chains comprise mounts 18 with rubber inserts 19 fitted at their end faces, these serving as counter welding jaws or cheeks. One folding flap on the opposite endless chain is provided with a welding jaw 13 movable relative to the folding flap 3, and which comprises heating elements 17. A parting knife 14, which is illustrated in FIGS. 6 and 7, is guided movably between the heating elements 17 and can be actuated by way of a roller 20 mounted on a support 15.

Figure 4:
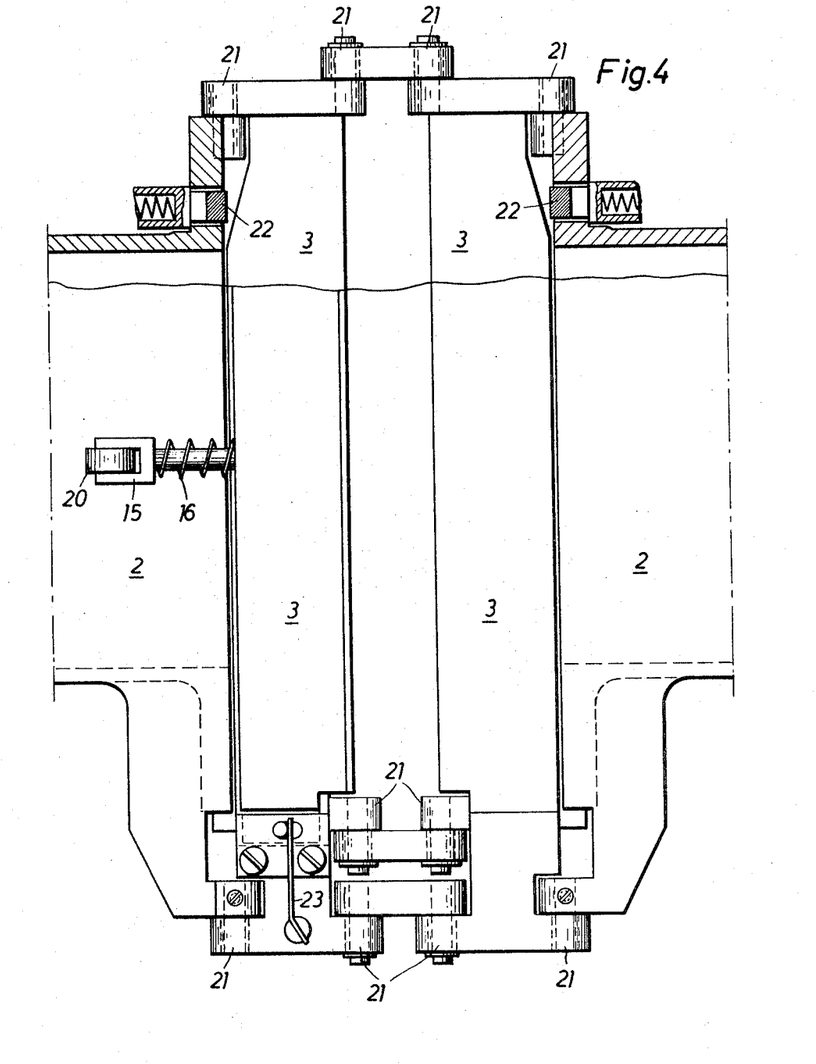
FIG. 4 is a longitudinal section through the shaping cells at right angles to FIG. 3.

As will be seen from FIG. 4, folding flaps 3 are extended laterally beyond shaping cell halves 2, so that the conventional triangular terminal lobes of the packs can be formed in this region. Welding devices 22, for spot welding the terminal lobes of the packs, are provided on shaping cell halves 2, as will be seen from FIGS. 3 and 4.

Figure 5:
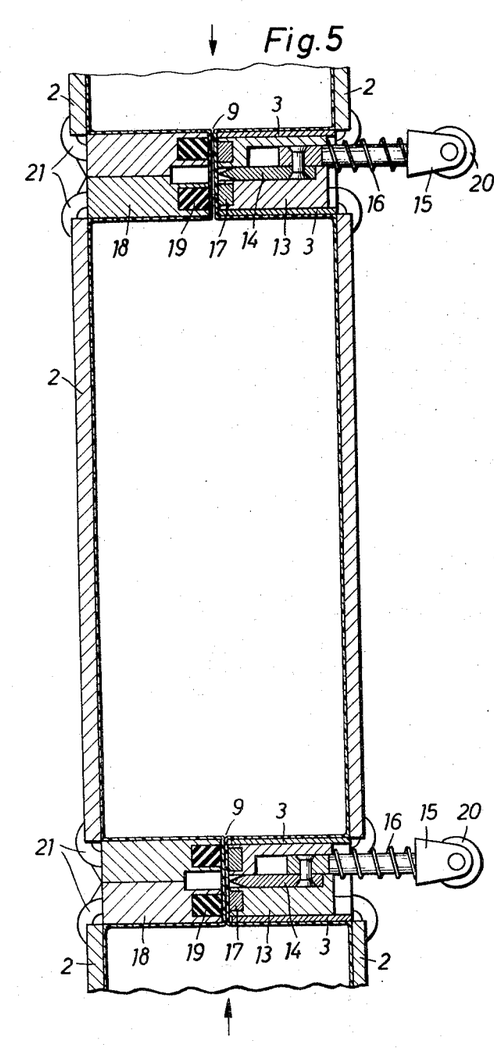
FIG. 5 is a section similar to FIG. 3, but with the folding flaps in the swung-in state.

As shown in FIG. 5, when the folding flaps are in the fully folded-in state, they leave a gap g free between their end edges, so that a narrow communication connection still exists between the contents of the formed parallelepiped pack and the column of filling material disposed thereover. Through this connection, the filling material can escape into the cell located thereinabove, so that exact shaping into the parallelepiped pack is insured and accurate metering is rendered possible.

On actuation of roller 20 by a control cam (not shown,) roller support 15 then first closes gap g through a spring 16 and by means of movable welding jaw 13, the welded seam being then formed by the heating element 17. In this process, spring 16 controls the welding pressure. The spring 23 shown in FIG. 4 normally holds movable welding jaw 13 in the retracted position. On further actuation of roller 20 by means of the suitably shaped control cam, parting knife 14 is then operated when the two welding jaws are in the state in which they are tightly pressed together, so that separated individual packs or cells are produced. The longitudinally arcuate form of the cutting edge of parting knife 14 causes the cutting operation to take place not suddenly or jerkily over the entire width of the pack, but in a suitably gentle manner, a correspondingly small actuating force being required for the parting knife.

As will be seen from FIG. 1, the finished pack or cell 12 is thereafter carried away in the region of the lower return wheels 4 as shaping cell halves 2 move apart. Thereupon, the projecting top and bottom welds and the triangular terminal lobes formed on the pack can then be applied against the latter and welded to it if desired.

Summing up, it will be apparent that the method and the apparatus according to the invention make it possible, using a flexible tube which is not previously compressed, to convert the latter by a continuous method, and thereby with a high output capacity, into exact parallelepiped packs or cells in such manner that, during the entire conversion process, no relative movements of any kind take place between the flexible tube and the shaping tools, which means that the material of the flexible tube is not subjected to any heavy loads and at the same time particularly neat and exact shaping of the packs is insured.

While a specific embodiment of the invention has been shown and described in detail to illustrate the application of the principles of the invention, it will be understood that the invention may be embodied otherwise without departing from such principles.

What is claimed is:

1. In a method of producing parallelepiped packs, filled with fluent material, from a continuous flexible tube filled to a predetermined level with the fluent material and without any preliminary compression of the tube in the region of the transverse edges of the packs to be formed, and with the individual packs being formed by lateral compression of oppositely disposed walls of the tubes at longitudinally spaced intervals corresponding to the desired size of the packs and with the production of transverse seams at such intervals and subsequent severing of the tube in the central zone of the transverse seams: the improvement comprising completely encasing the tube around its entire periphery and over a length thereof at least equal to the preselected length of a pack to deform the tube to a rectangular cross section and to advance the tube solely by frictional contact with the peripheral surface thereof; and, while progressively shaping selected lengths of the tube into interconnected packs of exact parallelepiped form and forming transverse terminal seals between the packs, maintaining a tube advancing tension on the tube not in excess of the frictional force exerted on the tube during initial gripping and shaping thereof.

2. In a method of producing prallelepiped packs, filled with fluent material, from a continuous flexible tube filled to a predetermined level with the fluent material and without any preliminary compression of the tube in the region of the transverse edges of the packs to be formed, and with the individual packs being formed by lateral compression of oppositely disposed walls of the tubes at longitudinally spaced intervals corresponding to the desired size of the packs and with the production of transverse seams at such intervals and subsequent severing of the tube in the central zone of the transverse seams: the improvement comprising gripping the tube around its entire periphery and over a length at least equal to the preselected length of a pack to deform the tube to a rectangular cross section and to exert a frictional force on the tube to advance the same continuously; thereafter shaping the tube to form a plurality of interconnected packs of exact parallelepiped form; while maintaining the shaped packs completely encased, maintaining communication between such packs and the column of filling material thereabove in the region of the upper transverse zone of tube wall compression thereof; thereafter forming transverse seals setting off the encased pack from adjacent packs; and, during shaping and sealing of the individual packs, exerting an advancing tension on the tube which is not in execess of the frictional force exerted on the tube walls during initial gripping and shaping thereof to a rectangular cross section.

3. In a method of producing parallelepiped packs, filled with fluent material, from a continuous flexible tube filled to a predetermined level with the fluent material and without any preliminary compression of the tube in the region of the transverse edges of the packs to be formed, and with the individual packs being formed by lateral compression of oppositely disposed walls of the tubes at longitudinally spaced intervals corresponding to the desired size of the packs and with the production of transverse seams at such intervals and subsequent severing of the tube in the central zone of the transverse seams: the improvement comprising frictionally gripping the tube wall over its entire periphery and throughout a length at least equal to the preselected length of an individual pack to deform the tube to a rectangular cross section and to frictionally advance the tube; thereafter shaping the tube into a plurality of interconnected packs having an exact parallelepiped form; maintaining the thus shaped packs completely encased while forming transverse seams sealing adjacent packs from each other; and, during shaping and sealing of the individual packs, exerting a tube advancing force on the tube which is not in excess of the frictional force exerted on the tube during the gripping and shaping thereof to a rectangular cross section.

4. In a method of producing parallelepiped packs the improvement claimed in claim 2, in which the individual packs are separated from each only after complete shaping of each individual pack and while the latter is still maintained completely encased.

5. Apparatus for producing parallelepiped packs, filled with fluent material, from a continuous flexible tube filled to a predetermined level with the fluid material and without any preliminary compression of the tube in the region of the transverse edges of the packs to be formed, said apparatus comprising, in combination, a pair of endless chains each having one run extending in spaced, parallel and facing relation to a run of the other; each of said chains comprising articulated shaping members arranged to completely enclose the flexible tube peripherally and deform it to a rectangular cross section; each shaping member having a length equal to the preselected length of the packs to be formed; articulated folding end members interconnecting said shaping members and arranged to be folded inwardly toward the tube during advance of the tube to form, with the associated shaping members, a casing completely enclosing a section of the tube having a parallelepiped form, to subdivide the tube into a plurality of interconnected shaped and encased packs of exact parallelepiped form; and means on said chains effective to form transverse seals between adjacent packs.

6. Apparatus for producing parallelepiped packs, filled wih fluid material, from a continuous flexible tube filled to a predetermined level with the fluid material, and without any preliminary compression of the tube in the region of the transverse edges of the packs to be formed, said apparatus comprising, in combination, a pair of endless chains each having a run in spaced, parallel facing relation to a run of the other; each chain comprising a plurality of articulated interconnected shaping members, each shaping member comprising a rectangular channel-shaped member opening outwardly of the associated conveyor, the shaping members on the two chains being arranged to complement each other to form a complete lateral enclosure for the tube, and each channel-shaped member having a length equal to the preselected length of the packs; each cooperating pair of shaping members engaging and confining the flexible tube at the commencement of an encasing operation to deform the latter to a rectangular cross section; and a pair of folding flaps associated with each shaping member, each flap being articulated to a respective end of the associated member and, at the commencement of the encasing operation, being oriented in the plane of the base portion of the associated shaping member; each flap, during advance of the tube while laterally encased by said shaping member, being swung inwardly through substantially 90° toward the tube wall about a pivotal axis extending along the adjacent edge of the base portion of the associated member to form substantially one half of an end wall of the casing partially defined by the interengaged and cooperating shaping members; said flaps when thus swung inwardly compressing the wall of the tube to subdivide the tube into interconnected parallelepiped shape packs.

7. Apparatus for producing parallelepiped packs, filled with fluid material, from a continuous flexible tube filled to a predetermined level with the fluid material, and without any preliminary compression of the tube in the region of the transverse edges of the packs to be formed, said apparatus comprising, in combination, a pair of endless chains each having a run in spaced, parallel facing relation to a run of the other; each chain comprising a plurality of articulatedly interconnected shaping members, each shaping member comprising a rectangular channel-shaped member opening outwardly of the associated conveyor, the shaping members on the two chains being arranged to complement each other to form a complete lateral enclosure for the tube, and each channel-shaped member having a length equal to the preselected lengths of the packs; each cooperating pair of shaping members engaging and confining the flexible tube at the commencement of an encasing operation to deform the latter to a rectangular cross section; and a pair of folding flaps associated with each shaping member, each flap being articulated to a respective end of the associated member and, at the commencement of the encasing operation, being oriented in the plane of the base portion of the associated shaping member; each flap, during advance of the tube while laterally encased by said shaping members, being swung inwardly through substantially 90° toward the tube wall about a pivotal axis extending along the adjacent edge of the base portion of the associated member to form substantially one half of an end wall of the casing partially defined by the interengaged and cooperating shaping members; said flaps, when thus swung inwardly, compressing the wall of the tube to subdivide the tube into interconnected parallelepiped shape packs; said flaps projecting laterally in both directions outwardly of the side surfaces of the associated shaping members so that, upon such swinging in of the flaps to form the parallelepiped packs, triangular lobes are formed from juxtaposed portions of the tube wall.

8. Apparatus for producing parallelepiped packs, filled with fluid material, from a continuous flexible tube filled to a predetermined compression of the tube in the region of the transverse edges of the packs to be formed, said apparatus comprising, in combination, a pair of endless chains having a run in spaced parallel, facing relation to a run of the other; each chain comprising a plurality of articulatedly interconnected shaping members, each shaping member comprising a rectangular channel-shaped member opening outwardly of the associated conveyor, the shaping members on the two chains being arranged to complement each other to form a complete lateral enclosure for the tube, and each channel-shaped member having a length equal to the preselected length of the packs; each cooperating pair of shaping members engaging and confining the flexible tube at the commencement of an encasing operation to deform the latter to a rectangular cross section; a pair of folding flaps associated with each shaping member, each flap being articulated to a respective end of the associated member and, at the commencement of the encasing operation, being oriented in the plane of the base portion of the associated shaping member; each flap, during advance of the tube while encased by said shaping member, being swung inwardly through substantially 90° toward the tube wall about a pivotal axis extending along the edge of the base portion of the associated member to form substantially one half of an end wall of the casing partially defined by the interengaged and cooperating shaping member; said flaps, when thus swung inwardly, compressing the wall of the tube to subdivide the tube into interconnected parallelepiped shape packs; and links connecting the adjacent flaps of longitudinally adjacent shaping members; the length of said links being equal to the preselected longitudinal lengths of the separating portions between adjacent parallelepiped shape packs.

9. Apparatus for producing parallelepiped packs, filled with fluid material, from a continuous flexible tube filled to a predetermined level with the fluid material, and without any preliminary compression of the tubes in the region of the transverse edges of the packs to be formed, said apparatus comprising, in combination, a pair of endless chains each having a run in spaced, parallel facing relation to a run of the other; each chain comprising a plurlity of articulatedly interconnected shaping members, each shaping member comprising a rectangular channel-shaped member opening outwardly of the associated conveyor, the shaping members on the two chains being arranged to complement each other to form a complete lateral enclosure for the tube, and each channel-shaped member having a length equal to the preselected length of the packs; each cooperating pair of shaping members engaging and confining the flexible tube at the commencement of an encasing operation to deform the latter to a rectangular cross section; and a pair of folding flaps associated with each shaping member, each flap being articulated to a respective end of the associated member and, at the commencement of the encasing operation, being oriented in the plane of the base portion of the associated shaping member; each flap, during advance of the tube while laterally encased by said shaping members, being swung inwardly through substantially 90° toward the tube wall about a pivotal axis extending along the adjacent edge of the base portion of the associated members to form substantially one half of an end wall of the casing partially defined by the interengaged and cooperating shaping members; said flaps, when thus swung inwardly, compressing the wall of the tube to subdivide the tube into interconnected parallelepiped shape packs; the width of each flap being less than that of one half the end wall of the associated parallelepiped shape pack whereby, when a pair of flaps are swung inwardly, a narrow gap is left between the adjacent edges thereof at the location of each transverse seam so that the fluent material in each encased and shaped parallelepiped pack is maintained in communication with the fluent material in the tube above such pack.

10. Apparatus for producing parallelepiped packs, filled with fluid material, from a continuous flexible tube filled to a predetermined level with the fluid material, and without any preliminary compression of the tube in the region of the transverse edges of the packs to be formed, said apparatus comprising, in combination, a pair of endless chains each having a run in spaced, parallel facing relation to a run of the other; each chain comprising a plurality of articulatedly interconnected shaping members, each shaping member comprising a rectangular channel-shaped member opening outwardly of the associated conveyor, the shaping members on the two chains being arranged to complement each other to from a complete lateral enclosure for the tube, and each channel-shaped member having a length equal to the preselected length of the packs; each cooperating pair of shaping members engaging and confining the flexible tube at the commencement of an encasing operation to deform the latter to a rectangular cross section; a pair of folding flaps associated with each shaping member, each flap being articulated to a respective end of the associated member and, at the commencement of the encasing operation, being oriented in the plane of the base portion of the associated shaping member; each flap, during advance of the tube while laterally encased by said shaping members, being swung inwardly through substantialy 90° toward the tube wall about a pivotal axis extending along the adjacent edge of the base portion of the associated member to form substantially one half of an end wall of the casing partially defined by the interengaged and cooperating shaping members; said flaps, when thus swung inwardly, compressing the wall of the tube to subdivide the tube into interconnected parallelepiped shape packs; and welding devices on said flaps operable, when said flaps are in the pack encasing position, to produce transverse seams in the tube sealing adjacent packs from each other.

11. Apparatus for producing parallelepiped packs, filled with fluid material, from a continuous flexible tube filled to a predetermined level with the fluid material, and without any preliminary compression of the tube in the region of the transverse edges of the packs to be formed, said apparatus comprising, in combination, a pair of endless chains each having a run in spaced, parallel facing relation to a run of the other; each chain comprising a plurality of articulatedly interconnected shaping members, each shaping member comprising a rectangular channel-shaped member opening outwardly of the associated conveyor, the shaping members on the two chains being arranged to complement each other to form a complete lateral enclosure for the tube, and each channel-shaped member having a length equal to the preselected length of the packs; each cooperating pair of shaping members engaging and confining the flexible tube at the commencement of an encasing operation to deform the latter to a rectangular cross section; a pair of folding flaps associated with each shaping member, each flap being articulated to a respective end of the associated member and, at the commencement of the encasing operation, being oriented in the plane of the base portion of the associated shaping member; each flap, during advance of the tube while laterally encased by said shaping members, being swung inwardly through substantially 90° toward the tube wall about a pivotal axis extending along the adjacent edge of the base portion of the associated member to form substantially one half of an end wall of the casing partially defined by the interengaged and cooperating shaping members; said flaps, when thus swung inwardly, compressing the wall of the tube to subdivide the tube into interconnected parallelepiped shape packs; fixed welding jaws on the flaps associated with one of said endless chains; movable welding jaws on the flaps associated with the other endless chain, said movable welding jaws being movable toward said fixed welding jaws; said movable welding jaws, when a pair of cooperating flaps are initially swung inwardly to complete the encasing of a pack, being spaced from the associated fixed welding jaws to provide a gap establishing communication between the encased pack and the fluent material in the tube above the respective encased pack; and means effective thereafter to move said movable welding jaws toward the associated fixed welding jaws to produce at least one transverse seam sealing the encased pack from an adjacent pack.

12. Apparatus for producing parallelepiped packs, filled with fluid material, from a continuous flexible tube filled to a predetermined level with the fluid material, and without any preliminary compression of the tube in the region of the transverse edges of the packs to be formed, said apparatus comprising, in combination, a pair of endless chains each having a run in spaced, parallel facing relation to a run of the other; each chain comprising a plurality of articulatedly interconnected shaping members, each shaping member comprising a rectangular channel-shaped member opening outwardly of the associated conveyor, the shaping members on the two chains being arranged to complement each other to form a complete lateral enclosure for the tube, and each channel-shaped member having a length equal to the preselected length of the packs; each cooperating pair of shaping members engaging and confining the flexible tube at the commencement of an encasing operation to deform the latter to a rectangular cross section; a pair of folding flaps associated with each shaping member, each flap being articulated to a respective end of the associated member and, at the commencement of the encasing operation, being oriented in the plane of the base portion of the associated shaping member; each flap, during advance of the tube while laterally encased by said shaping members, being swung inwardly through substantially 90° toward the tube wall about a pivotal axis extending along the adjacent edge of the base portion of the associated fixed welding jaws to provide a gap establishing wall of the casing partially defined by the interengaged and cooperating shaping members; said flaps, when thus swung inwardly, compressing the wall of the tube to subdivide the tube into interconnected parallelepiped shape packs; fixed welding jaws on the flaps associated with one of said endless chains; movable welding jaws on the flaps associated with the other endless chain, said movable welding jaws being movable toward said fixed welding jaws; said movable welding jaws, when a pair of cooperating flaps are initially swung inwardly to complete the encasing of a pack, being spaced from the associated fixed welding jaws to provide a gap establishing communication between the encased pack and the fluent material in the tube above the respective encased pack; means effective thereafter to move said movable welding jaws toward the associated fixed welding jaws to produce at least one transverse seam sealing the encased pack from an adjacent pack; the cooperating fixed and movable welding jaws on each associated pair of flaps being arranged in pairs to form a pair of seams spaced apart longitudinally of the tube; and a severing knife movably mounted between each pair of movable welding jaws and movable toward the associated fixed welding jaws to sever the encased pack from an adjacent pack; said severing knife extending laterally of the tube and having a longitudinally arcuate severing edge.

13. Apparatus for producing parallelepiped packs, filled with fluent material, from a continuous flexible tube filled to a predetermined level with fluent material, and without any preliminary compression of the tube in the region of the transverse edges of the packs to be formed, said apparatus comprising, in combination, a plurality of pairs of complementary shaping members having open ends and conjointly forming closed configurations completely embracing the tube laterally, while deforming the tube to a rectangular cross section and frictionally embracing the tube; said shaping members being arranged on a pair of endless chains each having a run in spaced, parallel facing relation with a run of the other; one shaping member of each pair being on each respective chain, and the shaping members of each pair coming into complementary tube laterally encasing relation at the commencement at the shaping of the operation to grip the tube and advance the same; means on each shaping member movable, during advance of the tube, to a position closing the ends of the associated shaping member to compress the tube walls to form a plurality of interconnected parallelepiped shape packs which are completely encased; means operable, while the packs are thus completely encased, to form transverse seals between adjacent packs; and means operable thereafter to sever the tube between transverse seals to separate each pack from the adjacent packs.

14. Apparatus for producing parallelepiped packs, filled with fluent material, from a continuous flexible tube filled to a predetermined level with fluent material, and without any preliminary compression of the tube in the region of the transverse edges of the packs to be formed, said apparatus comprising, in combination, a plurality of pairs of complementary shaping members having open ends and conjointly forming closed configurations completely embracing the tube laterally, while deforming the tube to a rectangular cross section and frictionally embracing the tube; said shaping members being arranged on a pair of endless chains each having a run in spaced, parallel facing relation with a run of the other; one shaping member of each pair being on each respective chain, and the shaping members of each pair coming into complementary tube laterally encasing relation at the commencement at the shaping of the operation to grip the tube and advance the same; means on each shaping member movable, during advance of the tube, to a position closing the ends of the associated shaping member to compress the tube walls to form a plurality of interconnected parallelepiped shape packs which are completely encased; means operable, while the packs are thus completely encased, to form transverse seals between adjacent packs; and interengageable means on the shaping members of each pair effective, upon interengagement of the shaping members, to inhibit relative longitudinal displacement thereof.

15. Apparatus for producing parallelepiped packs, filled with fluent material, from a continuous flexible tube filled to a predetermined level with fluent material, and without any preliminary compression of the tube in the region of the transverse edges of the packs to be formed, said apparatus comprising, in combination, a plurality of pairs of complementary shaping members having open ends and conjointly forming closed configurations completely embracing the tube laterally, while deforming the tube to a rectangular cross section and frictionally embracing the tube; said shaping members being arranged on a pair of endless chains each having a run in spaced, parallel facing relation with a run of the other; one shaping member of each pair being on each respective chain, and the shaping members of each pair coming into complementary tube laterally encasing relation at the commencement at the shaping of the operation to grip the tube and to advance the same; means on each shaping member movable, during advance of the tube, to a position closing the ends of the associated shaping member to compress the tube walls to form a plurality of interconnected parallelepiped shape packs which are completely encased; means operable, while the packs are thus completely encased, to form transverse seals between adjacent packs; and fixedly located guide members cooperable with the interengageable shaping members to exert pressure thereagainst transversely of the tube during advance of the latter, to maintain the complementary shaping members in engagement with each other.

16. Apparatus for producing parallelepiped packs, filled with fluent material, from a continuous flexible tube filled to a predetermined level with the fluent material, and without any preliminary compression of the tube in the region of the transverse edges of the packs to be formed, said apparatus comprising, in combination, a plurality of pairs of complementary shaping members of rectangular open ended channel form, the said shaping members being interconnected as a pair of endless chains each having a run in spaced parallel facing relation with a run of the other, and one shaping member of each pair being included in each respective endless chain; the shaping members of each pair coming into tube laterally enclosing relation at the commencement of the shaping apparatus and being effective to deform the tube to a rectangular cross section and to establish frictional engagement therewith to advance the tube; a pair of substantially rectangular end flaps associated with each shaping member, each end flap being pivotable about an axis extending transversely of the base at a respective end of the associated shaping member and said flaps normally lying in the plane of said base at the commencement of the shaping operation; stationary control cam means cooperable with said flaps, during advance of the tubes, to move the flaps inwardly to an angle of substantially 45° with respect to the direction of travel of the tube; means thereafter operable to move said flaps to positions completely closing the ends of the associated shaping members to form a parallelepiped casing completely enclosing tube wall material to divide the tube into a plurality of interconnected parallelepiped shape packs; means operable to form transverse seam sealing each pack from the adjacent packs; and means operable to sever the tube between transverse seams to separate the packs from each other.

17. Apparatus as claimed in claim 16, in which said means moving said flaps to the complete closure position comprises flexedly positioned driving rollers with the speed of successive driving rollers being decreased in the direction of the tube advance.

18. Apparatus for producing parallelepiped packs, filled with fluent material, from a continuous flexible tube filled to a predetermined level with fluent material, and without any preliminary compression of the tube in the region of the transverse edges of the packs to be formed, said apparatus comprising, in combination, a plurality of pairs of complementary shaping members having open ends and conjointly forming closed configurations completely embracing the tube laterally, while deforming the tube to a rectangular cross section and frictionally embracing the tube; said shaping members being arranged on a pair of endless chains each having a run in spaced, parallel facing relation with a run of the other; one shaping member of each pair being on each respective chain, and the shaping members of each pair coming into complementary tube laterally encasing relation at the commencement at the shaping of the operation to grip the tube and advance the same; means on each shaping member movable, during advance of the tube, to a position closing the ends of the associated shaping member to compress the tube walls to form a plurality of interconnected parallelepiped shape packs which are completely encased; means operable, while the packs are thus completely encased, to form transverse seals between adjacent packs; means operable thereafter to sever the tube between transverse seals to separate each pack from the adjacent packs; and brake rollers fixedly positioned in advance of the seam forming and severing zone in the direction of the tube movement and cooperable with said shaping members to exert a force on the latter maintaining the parallelepiped form of the packs and acting in the direction of tube advance.

19. Apparatus for producing parallelepiped packs, filled with fluent material, from a continuous flexible tube filled to a predetermined level with fluent material, and without any preliminary compression of the tube in the region of the transverse edges of the packs to be formed, said apparatus comprising, in combination, a plurality of pairs of complementary shaping members having open ends and conjointly forming closed configurations completely embracing the tube laterally, while deforming the tube to a rectangular cross section and frictionally embracing the tube; said shaping members being arranged on a pair of endless chains each having a run in spaced, parallel facing relation with a run of the other; one shaping member of each pair being on each respective chain, and the shaping members of each pair coming into complementary tube laterally encasing relation at the commencement at the shaping of the operation to grip the tube and advance the same; means on each shaping member movable, during advance of the tube, to a position closing the ends of the associated shaping member to compress the tube walls to form a plurality of interconnected parallelepiped shape packs which are completely encased; means operable, while the packs are thus completely encased, to form transverse seals between adjacent packs; means operable thereafter to sever the tube between transverse seals to separate each pack from the adjacent packs; and stationary guide elements engageable with the tube just in advance of the point of engagement of the tube by said shaping members to guide said tube between successive pairs of complementary shaping members.

20. Apparatus as claimed in claim 19, in which the tube engaging surfaces of said guide elements are longitudinally convex.

No references cited.

GRANVILLE Y. CUSTER, JR., *Primary Examiner.*